US011773469B2

(12) United States Patent
Heinze et al.

(10) Patent No.: US 11,773,469 B2
(45) Date of Patent: Oct. 3, 2023

(54) METAL COMPOSITION

(71) Applicant: Siemens Energy Global GmbH & Co. KG, Bayern (DE)

(72) Inventors: Christoph Heinze, Markkleeberg (DE); Torsten Jokisch, Neuenhagen bei Berlin (DE); Michael Ott, Mülheim an der Ruhr (DE); Britta Stöhr, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 51 days.

(21) Appl. No.: 17/261,685

(22) PCT Filed: Jul. 24, 2019

(86) PCT No.: PCT/EP2019/069882
§ 371 (c)(1),
(2) Date: Jan. 20, 2021

(87) PCT Pub. No.: WO2020/025413
PCT Pub. Date: Feb. 6, 2020

(65) Prior Publication Data
US 2021/0260649 A1    Aug. 26, 2021

(30) Foreign Application Priority Data
Aug. 2, 2018  (EP) ..................... 18187030

(51) Int. Cl.
C22C 1/04       (2023.01)
B22F 5/04       (2006.01)
B22F 1/12       (2022.01)
B22F 10/28      (2021.01)
B22F 10/14      (2021.01)

(52) U.S. Cl.
CPC .............. *C22C 1/0433* (2013.01); *B22F 1/12* (2022.01); *B22F 5/04* (2013.01); *B22F 10/14* (2021.01); *B22F 10/28* (2021.01); *B22F 2301/052* (2013.01); *B22F 2301/056* (2013.01); *B22F 2301/205* (2013.01); *B22F 2301/35* (2013.01); *B22F 2302/253* (2013.01); *B22F 2302/45* (2013.01)

(58) Field of Classification Search
CPC .......... B22F 1/0003; B22F 5/04; B22F 10/28; B22F 2301/052; B22F 2301/056; B22F 2301/205; B22F 2301/35; B22F 2302/253; B22F 2302/45; B22F 10/10; B22F 10/20; Y02P 10/25; C22C 32/0026; C22C 1/0433; B33Y 70/00; B33Y 10/00
See application file for complete search history.

(56) References Cited

U.S. PATENT DOCUMENTS

| | | | | |
|---|---|---|---|---|
| 4,668,312 A | * | 5/1987 | Benn ................... | C22C 32/0026 148/428 |
| 2003/0047251 A1 | | 3/2003 | Caron et al. | |
| 2004/0177901 A1 | | 9/2004 | Yoshinari et al. | |
| 2013/0228302 A1 | | 9/2013 | Rickenbacher | |
| 2013/0263977 A1 | | 10/2013 | Rickenbacher et al. | |
| 2015/0354358 A1 | * | 12/2015 | Grande, III ............ | B22F 5/009 420/448 |
| 2017/0021453 A1 | | 1/2017 | Engeli et al. | |
| 2017/0209923 A1 | | 7/2017 | Giovannetti et al. | |
| 2018/0187569 A1 | | 7/2018 | Ucok et al. | |
| 2019/0048451 A1 | * | 2/2019 | Ota ..................... | B22F 9/082 |
| 2019/0337856 A1 | | 11/2019 | Liu et al. | |

FOREIGN PATENT DOCUMENTS

| | | | |
|---|---|---|---|
| CN | 1045607 A | 9/1990 | |
| CN | 101429607 A | 5/2009 | |
| CN | 101948970 A | 1/2011 | |
| CN | 103966500 A | 8/2014 | |
| CN | 105828983 A | 8/2016 | |
| CN | 107073581 A | 8/2017 | |
| CN | 108251678 A | 7/2018 | |
| EP | 0382585 A1 | 8/1990 | |
| EP | 1433865 A1 | 6/2004 | |
| EP | 2586887 A1 | 5/2013 | |
| EP | 2589449 A1 | 5/2013 | |
| EP | 2886225 A1 | 6/2015 | |
| EP | 3345699 A1 | 7/2018 | |
| WO | 2016012399 A1 | 1/2016 | |
| WO | WO-2016012399 A1 * | 1/2016 | ............ B22F 1/0018 |

OTHER PUBLICATIONS

INCO: "Technical Data Alloy IN-738 Technical Data", XP055589567, Gefunden im Internet: URL:https://www.nickelinstitute.org/media/1709/in_738alloy_preliminarydata_497_.pdf; [gefunden am May 16, 2019]; pp. 2; table I; the whole document; 2002.
Rickenbacher L. et al: "High temperature material properties of IN738LC processed by selective laser melting (SLM) technology", Rapid Prototyping Journal, pp. 282-290, XP055109051, Bradford, DOI: 10.1108/13552541311323281, Retrieved from the Internet: URL:http://search.proquest.com/docview/1355328844, [retrieved on Feb. 6, 2019]; abstract, pp. 287; figure 5; 2013.
Holt R T: ""Impurities and Trace Elements in Nickel-Base Superalloys"", International Metals Review, Metals Society, London, GB, vol. 21, No. 1, pp. 1-24, XP009173776, ISSN: 0308-4590, DOI: 10.1179/IMTR.1976.21.1.1 abstract; pp. 3, left-hand column—right-hand column, line 5; table 3; 1976.
PCT International Search Report and Written Opinion of International Searching Authority dated Oct. 10, 2019 corresponding to PCT International Application No. PCT/EP2019/069882 filed Jul. 24, 2019.

(Continued)

*Primary Examiner* — John A Hevey
(74) *Attorney, Agent, or Firm* — WOLTER VAN DYKE DAVIS, PLLC

(57) ABSTRACT

A metal composition, a method for additive manufacturing using such metal composition and the use of such metal composition is provided. The components of the metal composition are selected according to ranges and typically provide a more generic applicability in additive manufacturing.

19 Claims, No Drawings

(56) References Cited

OTHER PUBLICATIONS

Wenjiang, Qiang et al:"Metal Material Science"; Metallurgical Industry Press; Sep. 30, 2016, pp. 163; [Cited in NPL4 as "A" reference].

Zhu, Rizhang et al: "Heat-resistant Steel and Superalloys"; Beijing: Chemical Industry Press; pp. 168-179,Year: Jan. 31, 1996; [Cited in NPL4 as "A" reference].

GB/T 14992-2005: "Classification and grades of high temperature materials for superalloys and intermetallic compounds"; Issued by Standardization Administration of China, published by Standards Press of China; Jul. 21, 2005, p. 13, Table 2; [English Translation attached].

CN Office Action and search report dated Sep. 28, 2021, for corresponding Chinese Patent Application No. 201980051094.6, [English machine translation attached].

\* cited by examiner

METAL COMPOSITION

CROSS REFERENCE TO RELATED APPLICATIONS

This application is the US National Stage of International Application No. PCT/EP2019/069882 filed 24 Jul. 2019, and claims the benefit thereof. The International Application claims the benefit of European Application No. EP18187030 filed 2 Aug. 2018. All of the applications are incorporated by reference herein in their entirety.

FIELD OF INVENTION

The invention refers to a metal composition. Furthermore, the invention refers to a method of manufacturing using said metal composition. Furthermore, the present invention refers to a use of said metal composition.

BACKGROUND OF INVENTION

Metals are highly important materials used in modern industry. This is true despite some people limiting their view to certain materials like plastics that became an essential part of modern life in the past decades metal is and will remain the backbone of modern life. Herein, the metals are almost essentially used in form of their alloys to provide characteristics tailored specifically to the corresponding needs. The area of alloys is continuously point of further developments even on established working fields.

Herein, the area of 3D-printing started to provide a new way of building parts like spare parts. This flexible yet highly exact manufacturing method, however, provides new challenges that have to be solved to provide the products requested. For example, the layerwise build-up process results in problems as established materials for known applications might not always perform as well as they do using established production processes used in this context. Herein, such problem becomes of special interest for high performance applications like the use in streaming engines.

The research, for example, within the area of streaming engines already resulted in a great number of different alloys to address the specific needs in this context. However, the additive manufacturing methods, especially 3D-printing, required some additional review to ensure that the specific needs like high reliability under extreme conditions are also addressed when using known metal compositions for such new method of manufacturing. For example, the melting process of the metal composition in a process like SLM differs from the melting of a typically employed casting process as used for, for example, vanes, blades and heat shields. To this point specifically adapting and optimizing the production process parameters might be used to minimize or even negate negative effects of this production method using commonly available alloys. However, it would be very beneficial, if common production parameters could be used for production process without requiring specifically adapting the process to the specifics of each part or at least reducing such required adaptions.

SUMMARY OF INVENTION

This problem is solved by the products, methods and uses as disclosed hereafter and in the claims. Further beneficial embodiments are disclosed in the dependent claims and the further description. These benefits can be used to adapt the corresponding solution to specific needs or to solve further problems.

DETAILED DESCRIPTION OF INVENTION

According to an aspect the invention refers to a nickel based metal composition comprising:
7.7 wt.-% to 9.3 wt.-% Co,
15.5 wt.-% to 16.6 wt.-% Cr,
0.001 wt.-% to 0.13 wt.-% Fe,
0 wt.-% to 0.02 wt.-% Mn,
1.3 wt.-% to 2.2 wt.-% Mo,
2.1 wt.-% to 3.1 wt.-% W,
3 wt.-% to 4.22 wt.-% Al,
3 wt.-% to 4 wt.-% Ti,
0.45 wt.-% to 1.35 wt.-% Nb,
0.9 wt.-% to 1.6 wt.-% Ta,
0.001 wt.-% to 0.8 wt.-% Hf,
0 wt.-% to 0.05 wt.-% Si,
0 wt.-% to 0.01 wt.-% P,
0 wt.-% to 0.01 wt.-% S,
0 wt.-% to 0.31 wt.-% O,
0 wt.-% to 0.01 wt.-% N,
0.03 wt.-% to 0.15 wt.-% C,
0 wt.-% to 0.03 wt.-% Zr,
0.004 wt.-% to 0.015 wt.-% B,
0 wt.-% to 1.06 wt.-% Y,
incidental impurities,
Nickel,
based on the total weight of the metal composition. Typically it is preferred that the amount of Nickel is at least 35 wt.-%, more preferred at least 45 wt.-%, even more preferred at least 50 wt.-%.

According to an aspect the invention refers to a metal composition consisting of:
7.7 wt.-% to 9.3 wt.-% Co,
15.5 wt.-% to 16.6 wt.-% Cr,
0.001 wt.-% to 0.13 wt.-% Fe,
0 wt.-% to 0.02 wt.-% Mn,
1.3 wt.-% to 2.2 wt.-% Mo,
2.1 wt.-% to 3.1 wt.-% W,
3 wt.-% to 4.22 wt.-% Al,
3 wt.-% to 4 wt.-% Ti,
0.45 wt.-% to 1.35 wt.-% Nb,
0.9 wt.-% to 1.6 wt.-% Ta,
0.001 wt.-% to 0.8 wt.-% Hf,
0 wt.-% to 0.05 wt.-% Si,
0 wt.-% to 0.01 wt.-% P,
0 wt.-% to 0.01 wt.-% S,
0 wt.-% to 0.31 wt.-% O,
0 wt.-% to 0.01 wt.-% N,
0.03 wt.-% to 0.15 wt.-% C,
0 wt.-% to 0.03 wt.-% Zr,
0.004 wt.-% to 0.015 wt.-% B,
0 wt.-% to 1.06 wt.-% Y,
incidental impurities,
rest nickel, preferably at least 54 wt.-% Ni, more preferred at least 55 wt.-% Ni, based on the total weight of the metal composition.

According to another aspect the present invention refers to a method for additive manufacturing, preferably 3D-printing, using an inventive metal composition.

According to another aspect the invention refers to a product containing an inventive metal composition, or manufactured from an inventive metal composition, or manufactured according to an inventive method according.

According to another aspect the invention refers to a use of an inventive metal composition for additive manufacturing, preferably 3D-printing.

To simplify understanding of the present invention it is referred to the detailed description hereafter. However, the invention is not to be understood being limited to these preferred embodiments as they represent embodiments providing additional benefits to solve specific problems or fulfilling specific needs. The scope of protection should be understood to be only limited by the claims attached.

According to one aspect the present invention refers to an alloy as described above. Surprisingly, the inventive alloy provides at least a greatly simplified production process requiring little to no adaptions of the production procedure to process the alloys while maintaining their excellent properties being essential, for example, for their use in streaming engines. As such applications have high requirements like high reliability of the parts used therein like vanes and blades, simplifying such production procedure also reducing the amount of required adaptions simultaneously reduces the risks resulting from new designs and, thus, also increases safety and opens the possibility to further optimize the design of corresponding parts.

According to further embodiments of the present invention it is preferred that the amount of Mn is less than 0.01 wt.-%, based on the total weight of the metal composition. Such alloys typically provided a more generic applicability of these alloys in additive manufacturing.

According to further embodiments of the present invention it is preferred that the metal composition contains
  1.5 wt.-% to 2.0 wt.-%, more preferred 1.55 wt.-% to 1.9 wt.-%, even more preferred around 1.7 wt.-%, Mo, and/or
  1.5 wt.-% to 2.0 wt.-% W,
based on the total weight of the metal composition. Typically, it is preferred that both components are selected from the aforementioned ranges in the inventive metal compositions, especially its alloys. Especially in this case the resulting products typically provide a significantly increased overall stability.

According to further embodiments of the present invention it is preferred that the metal composition contains
  8 wt.-% to 9 wt.-% Co,
  15.7 wt.-% to 16.3 wt.-% Cr,
  0.005 wt.-% to 0.1 wt.-% Fe, and/or
  0.06 wt.-% to 0.1 wt.-%, more preferred 0.07 wt.-% to 0.09 wt.-%, C,
based on the total weight of the metal composition. Typically, it is preferred that all of the aforementioned components of the inventive metal compositions are selected according to these ranges. Such metal compositions typically provide, for example, an improved applicability and increased resistance.

According to further embodiments of the present invention it is preferred that the metal composition contains
  0 wt.-% to 0.02 wt.-% O, and/or
  0 wt.-% to 0.005 wt.-% N,
based on the total weight of the metal composition. Typically, it is especially preferred that the oxygen and nitrogen content of the inventive metal composition are selected according to the aforementioned ranges. It was noted that especially products manufactured by 3D printing using such metal compositions typically provided a more reliable high quality. For example, they seem to provide a lower chance of cracks even without optimizing the layerwise production scheme.

According to further embodiments of the present invention it is preferred that the metal composition contains
  3.2 wt.-% to 3.87 wt.-% Al,
  3.2 wt.-% to 3.7 wt.-% Ti,
  1.1 wt.-% to 1.4 wt.-% Ta,
  0.005 wt.-% to 0.6 wt.-%, more preferred 0.05 wt.-% to 0.2 wt.-%, Hf,
  0 wt.-% to 0.03 wt.-% Si,
  0 wt.-% to 0.001 wt.-% P,
  0 wt.-% to 0.001 wt.-% S,
  0 wt.-% to 0.005 wt.-% N,
  0.001 wt.-% to 0.02 wt.-% Zr, and/or
  0.007 wt.-% to 0.012 wt.-% B,
based on the total weight of the metal composition. Typically, it is preferred that at least 3, more preferred at least 5, even more preferred all, of the aforementioned components of the inventive metal compositions are selected according to the aforementioned ranges. Such metal compositions typically especially provided an improved behavior of the metal melt as being especially important, for example, for 3D-printing manufacturing processes like selective laser melting or electron beam melting.

Unless explicitly specified otherwise the wt.-% of the components of a metal composition as specified herein consisting of multiple components preferably amount to 100 wt.-% based on all components contained therein, whether these components are explicitly mentioned or not. Embodiments disclosing more specific ranges for a limited number of these components are only to limit the ranges of these specific components, while the wt.-% of the amounts of all components of such more restricted metal composition should still amount to 100 wt.-% also after including the more specific ranges of such specific embodiments.

The term "incidental impurities" as used herein refers to additional components of the metal composition resulting from especially impurities of the base materials used to produce the metal composition. For example technical grade metals typical include small amounts impurities of other metals not influencing, preferably at least not negatively influencing, the properties of the resulting alloy. In this context, it is especially referred to the alloy resulting from processing the inventive metal composition using the additive manufacturing process as disclosed herein resulting, for example, from melting the metal composition by a laser used during selective laser melting. Typically, it is preferred that such incidental impurities amount up to 1 wt.-%, more preferred up to 0.6 wt.-%, even more preferred up to 0.4 wt.-%, based on the total weight of the metal composition. Additionally or alternatively it is in further embodiments preferred that the amount of each of such incidental impurity is at most 0.2 wt.-%, more preferred at most 0.13 wt.-%, even more preferred at most 0.1 wt.-%, based on the total weight of the metal composition.

According to further embodiments of the present invention it is preferred that the metal composition contains oxide particles selected from the group consisting of $Y_2O_3$ particles and $YAlO_3$ particles. Such particles typically increase the overall strength of the product resulting from said metal composition.

According to further embodiments of the present invention it is preferred that the metal composition contains:
  3 wt.-% to 4.22 wt.-% Al, 0 wt.-% to 0.31 wt.-% O, and 0 wt.-% to 1.06 wt.-% Y,
  more preferred 3.2 Wt.-% to 3.87 wt.-% Al, 0 wt.-% to 0.24 wt.-% O, and 0 wt.-% to 0.81 wt.-% Y,
  even more preferred 3.2 wt.-% to 3.47 wt.-% Al, 0 wt.-% to 0.24 wt.-% O, and 0 wt.-% to 0.81 wt.-% Y, wherein at least 30 wt.-%, more preferred at least 50 wt.-%, even more preferred at least 80 wt.-%, of the Y is part of metal oxide particles.

According to further embodiments of the present invention it is preferred that the metal composition comprises:
8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.5 wt.-% to 2 wt.-% Mo,
2.4 wt.-% to 2.8 wt.-% W,
3.2 wt.-% to 3.87 wt.-% Al,
3.2 wt.-% to 3.7 wt.-% Ti,
0.6 wt.-% to 1.1 wt.-% Nb,
1.1 wt.-% to 1.4 wt.-% Ta,
0.005 wt.-% to 0.6 wt.-% Hf,
0 wt.-% to 0.03 wt.-% Si,
0 wt.-% to 0.001 wt.-% P,
0 wt.-% to 0.001 wt.-% S,
0 wt.-% to 0.24 wt.-% O,
0 wt.-% to 0.005 wt.-% N,
0.06 wt.-% to 0.1 wt.-% C,
0.001 wt.-% to 0.02 wt.-% Zr,
0.007 wt.-% to 0.012 wt.-% B,
0.001 wt.-% to 0.81 wt.-% Y,
incidental impurities
Nickel,
based on the total weight of the metal composition. Typically it is preferred that the amount of Nickel is at least 38 wt.-%, more preferred at least 49 wt.-%, even more preferred at least 55 wt.-%. Such alloy typically provided especially beneficial results for providing components of a streaming engine being used in the fluid stream.

According to further embodiments of the present invention it is preferred that the metal composition contains at least 0.005 wt.-% Fe and/or at least 0.005 wt.-% Hf. Such metal compositions typically provide an improved processability for additive manufacturing.

An especially beneficial metal composition typically providing very good results for 3D-printing production processes is listed below. This metal composition provided, for example, excellent results for selective laser melting and selective laser sintering manufacturing processes. According to further embodiments of the present invention it is preferred that the metal composition consists of:
8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.5 wt.-% to 2 wt.-% Mo,
2.4 wt.-% to 2.8 wt.-% W,
3.2 wt.-% to 3.87 wt.-% Al,
3.2 wt.-% to 3.7 wt.-% Ti,
0.6 wt.-% to 1.1 wt.-% Nb,
1.1 wt.-% to 1.4 wt.-% Ta,
0.005 wt.-% to 0.6 wt.-% Hf,
0 wt.-% to 0.03 wt.-% Si,
0 wt.-% to 0.001 wt.-% P,
0 wt.-% to 0.001 wt.-% S,
0 wt.-% to 0.24 wt.-% O,
0 wt.-% to 0.005 wt.-% N,
0.06 wt.-% to 0.1 wt.-% C,
0.001 wt.-% to 0.02 wt.-% Zr,
0.007 wt.-% to 0.012 wt.-% B,
0.001 wt.-% to 0.81 wt.-% Y,
incidental impurities
rest nickel, preferably at least 57 wt.-% Ni, more preferred at least 58 wt.-% Ni, based on the total weight of the metal composition. It is typically preferred that the incidental impurities amount up to 1 wt.-%, more preferred up to 0.6 wt.-%, even more preferred up to 0.4 wt.-%.

According to further embodiments of the present invention it is preferred that the metal composition consists of:
8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.55 wt.-% to 1.9 wt.-% Mo,
2.4 wt.-% to 2.8 wt.-% W,
3.2 wt.-% to 3.67 wt.-% Al,
3.2 wt.-% to 3.3 wt.-% Ti,
0.7 wt.-% to 0.9 wt.-% Nb,
1.1 wt.-% to 1.4 wt.-% Ta,
0.05 wt.-% to 0.2 wt.-% Hf,
0 wt.-% to 0.03 wt.-% Si,
0 wt.-% to 0.001 wt.-% P,
0 wt.-% to 0.001 wt.-% S,
0 wt.-% to 0.24 wt.-% O,
0 wt.-% to 0.005 wt.-% N,
0.07 wt.-% to 0.09 wt.-% C,
0.001 wt.-% to 0.02 wt.-% Zr,
0.007 wt.-% to 0.012 wt.-% B,
0.001 wt.-% to 0.81 wt.-% Y,
incidental impurities
rest nickel, preferably at least 58 wt.-% Ni, more preferred at least 59 wt.-% Ni, based on the total weight of the metal composition.

Typically, it was further especially preferred that certain components are included in the metal composition in the form of oxide particles, while reducing the amount of other oxides. These stable oxide particles seem to increase the overall strength while being at least not completely melted or dissolved under typical manufacturing conditions. According to further embodiments of the present invention it is preferred that the metal composition consists of:
7.7 wt.-% to 9.3 wt.-% Co,
15.5 wt.-% to 16.6 wt.-% Cr,
0.001 wt.-% to 0.13 wt.-% Fe,
0 wt.-% to 0.02 wt.-% Mn,
1.3 wt.-% to 2.2 wt.-% Mo,
2.1 wt.-% to 3.1 wt.-% W,
3 wt.-% to 4 wt.-% Al,
3 wt.-% to 4 wt.-% Ti,
0.45 wt.-% to 1.35 wt.-% Nb,
0.9 wt.-% to 1.6 wt.-% Ta,
0.001 wt.-% to 0.8 wt.-% Hf,
0 wt.-% to 0.05 wt.-% Si,
0 wt.-% to 0.01 wt.-% P,
0 wt.-% to 0.01 wt.-% S,
0 wt.-% to 0.025 wt.-% O,
0 wt.-% to 0.01 wt.-% N,
0.03 wt.-% to 0.15 wt.-% C,
0 wt.-% to 0.03 wt.-% Zr,
0.004 wt.-% to 0.015 wt.-% B,
0 wt.-% to 0.03 wt.-% Y,
incidental impurities
additionally to the above mentioned components up to 1.3 wt.-% metal oxide particles selected from the group consisting of $Y_2O_3$ and $YAlO_3$, more preferred from the group consisting of $Y_2O_3$, rest nickel, preferably at least 54 wt.-% Ni, more preferred at least 55 wt.-% Ni, based on the total weight of the metal composition.

According to further embodiments of the present invention it is preferred that at least 90 wt.-%, more preferred 98 wt.-%, even more preferred at least 99 wt.-%, of the metal oxide particles are $Y_2O_3$ particles. It was noted that these particles are especially useful for typical applications like selective laser melting.

A further especially beneficial metal composition typically providing very good results for 3D-printing production processes is listed below. Herein, the alloy resulting from the specified components optionally including metal oxide particles typically provided especially beneficial results for highly stressed components used, for example, in gas turbines. According to further embodiments of the present invention it is preferred that the metal composition consists of:

8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.5 wt.-% to 2 wt.-% Mo,
2.4 wt.-% to 2.8 wt.-% W,
3.2 wt.-% to 3.7 wt.-% Al,
3.2 wt.-% to 3.7 wt.-% Ti,
0.6 wt.-% to 1.1 wt.-% Nb,
1.1 wt.-% to 1.4 wt.-% Ta,
0.005 wt.-% to 0.6 wt.-% Hf,
0 wt.-% to 0.03 wt.-% Si,
0 wt.-% to 0.001 wt.-% P,
0 wt.-% to 0.001 wt.-% S,
0 wt.-% to 0.02 wt.-% O,
0 wt.-% to 0.005 wt.-% N,
0.06 wt.-% to 0.1 wt.-% C,
0.001 wt.-% to 0.02 wt.-% Zr,
0.007 wt.-% to 0.012 wt.-% B,
0.001 wt.-% to 0.02 wt.-% Y,
incidental impurities
additionally to the above mentioned components up to 1 wt.-% metal oxide particles selected from the group consisting of $Y_2O_3$ and $YAlO_3$, more preferred from the group consisting of $Y_2O_3$,
rest nickel, preferably 57 wt.-% Ni, more preferred at least 58 wt.-% Ni, based on the total weight of the metal composition.

According to further embodiments of the present invention it is preferred that the metal composition consists of:
8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.55 wt.-% to 1.9 wt.-% Mo,
2.4 wt.-% to 2.8 wt.-% W,
3.3 wt.-% to 3.5 wt.-% Al,
3.2 wt.-% to 3.3 wt.-% Ti,
0.7 wt.-% to 0.9 wt.-% Nb,
1.1 wt.-% to 1.4 wt.-% Ta,
0.05 wt.-% to 0.2 wt.-% Hf,
0 wt.-% to 0.03 wt.-% Si,
0 wt.-% to 0.001 wt.-% P,
0 wt.-% to 0.001 wt.-% S,
0 wt.-% to 0.02 wt.-% O,
0 wt.-% to 0.005 wt.-% N,
0.07 wt.-% to 0.09 wt.-% C,
0.001 wt.-% to 0.02 wt.-% Zr,
0.007 wt.-% to 0.012 wt.-% B,
0.001 wt.-% to 0.02 wt.-% Y,
incidental impurities
additionally to the above mentioned components up to 1 wt.-% metal oxide particles selected from the group consisting of $Y_2O_3$ and ceramic particles, preferably $Al_2O_3$, and $SiO_2$, more preferred from the group consisting of $Y_2O_3$, $Al_2O_3$ and $SiO_2$,
rest nickel, preferably 58 wt.-% Ni, more preferred at least 59 wt.-% Ni, based on the total weight of the metal composition.

According to further embodiments of the present invention it is preferred that the metal composition contains no metal oxide particles. Such metal compositions are typically more easily prepared.

According to another aspect the invention refers to a method for additive manufacturing, preferably 3D-printing, using an inventive metal composition. For such applications the inventive metal compositions proved to be especially beneficial. Herein, the alloy as specified by the components of the metal composition above optionally including metal oxide particles provide a typically highly reliable product using different means of additive manufacturing, preferably 3D-printing, and different parameters and/or building processes of such method.

According to further embodiments of the present invention it is preferred that the method of additive manufacturing is selected from the group consisting of selective laser melting (SLM), selective laser sintering (SLS), electron beam melting (EBM) and binder jetting.

According to further embodiments of the present invention it is preferred that the metal composition is used as powder. Herein, a mixture of different powder can be used like, for example, a first powder containing the inventive alloy and a second powder containing the metal oxide particles or the metal oxide particles and further inventive alloy, or the first powder contains a part of the components of the inventive alloy and the second powder contains the metal oxide particles and the rest of the components of the inventive alloy.

According to another aspect the present invention refers to a product containing an inventive metal composition, or manufactured from an inventive metal composition, or manufactured according to an inventive method.

According to further embodiments of the present invention it is preferred that the product is a powder to be used in additive manufacturing, preferably 3D-printing. It was noted that the inventive metal composition can be easily used to provide a metal composition powder being very efficiently used in existing devices for additive manufacturing and especially 3D-printing.

According to further embodiments of the present invention it is preferred that the product is selected from parts of a streaming engine, preferably a gas turbine. Herein, the high flexibility resulting from the improved characteristics of the metal composition combined with its high quality of product manufactured herewith is very beneficial for especially such application.

According to further embodiments of the present invention it is preferred that the product is adapted to contact the fluid stream of the streaming engine. Examples for such streaming engines are steam turbines and gas turbines, especially gas turbines. Such components are highly stressed and benefit greatly from the inventive metal compositions.

According to further embodiments of the present invention it is preferred that the product is selected from the group consisting of vanes, blades, heat shields and burners of a streaming engine, more preferred of a steam turbine or gas turbine, even more preferred of a gas turbine.

According to another aspect the present invention refers to a use of an inventive metal composition for additive manufacturing, preferably 3D-printing. Especially, a layer-wise structured production process as used in 3D-printing benefits greatly from the inventive metal composition.

According to further embodiments of the present invention it is preferred that the method of additive manufacturing is selected from the group consisting of selective laser melting (SLM), selective laser sintering (SLS), electron beam melting (EBM) and binder jetting. For these applications especially good results have been obtained

The invention claimed is:

1. A metal composition consisting of:
7.7 wt.-% to 9.3 wt.-% Co,
15.5 wt.-% to 16.6 wt.-% Cr,
0.001 wt.-% to 0.13 wt.-% Fe,
0 wt.-% to 0.02 wt.-% Mn,
1.3 wt.-% to 2.2 wt.-% Mo,
2.1 wt.-% to 3.1 wt.-% W,
3 wt.-% to 4.22 wt.-% Al,
3 wt.-% to 4 wt.-% Ti,
0.45 wt.-% to 1.35 wt.-% Nb,
0.9 wt.-% to 1.6 wt.-% Ta,
0.001 wt.-% to 0.8 wt.-% Hf,
0 wt.-% to 0.05 wt.-% Si,
0 wt.-% to 0.01 wt.-% P,
0 wt.-% to 0.01 wt.-% S,
0 wt.-% to 0.31 wt.-% O,
0 wt.-% to 0.01 wt.-% N,
0.03 wt.-% to 0.15 wt.-% C,
0 wt.-% to 0.03 wt.-% Zr,
0.004 wt.-% to 0.015 wt.-% B,
0 wt.-% to 1.06 wt.-% Y,
incidental impurities,
rest nickel,
based on the total weight of the metal composition.

2. The metal composition according to claim 1, wherein the metal composition contains oxide particles selected from the group consisting of $Y_2O_3$ particles and $YAlO_3$ particles.

3. The metal composition according to claim 1, wherein the metal composition contains:
3 wt.-% to 4.22 wt.-% Al, 0 wt.-% to 0.31 wt.-% O, and 0 wt.-% to 1.06 wt.-% Y,
wherein at least 30 wt.-% of the Y is part of metal oxide particles.

4. The metal composition according to claim 1, wherein the metal composition contains:
3 wt.-% to 4.22 wt.-% Al,
0 wt.-% to 0.31 wt.-% O,
0 wt.-% to 1.06 wt.-% Y,
or
wherein at least 30 wt.-% of the Y is part of metal oxide particles.

5. The metal composition according to claim 1, wherein the metal composition consists of:
8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.5 wt.-% to 2 wt.-% Mo,
2.4 wt.-% to 2.8 wt.-% W,
3.2 wt.-% to 3.87 wt.-% Al,
3.2 wt.-% to 3.7 wt.-% Ti,
0.6 wt.-% to 1.1 wt.-% Nb,
1.1 wt.-% to 1.4 wt.-% Ta,
0.005 wt.-% to 0.6 wt.-% Hf,
0 wt.-% to 0.03 wt.-% Si,
0 wt.-% to 0.001 wt.-% P,
0 wt.-% to 0.001 wt.-% S,
0 wt.-% to 0.24 wt.-% O,
0 wt.-% to 0.005 wt.-% N,
0.06 wt.-% to 0.1 wt.-% C,
0.001 wt.-% to 0.02 wt.-% Zr,
0.007 wt.-% to 0.012 wt.-% B,
0.001 wt.-% to 0.81 wt.-% Y,
incidental impurities
rest nickel,
based on the total weight of the metal composition.

6. The metal composition according to claim 1, wherein the metal composition consists of:
8 wt.-% to 9 wt.-% Co,
15.7 wt.-% to 16.3 wt.-% Cr,
0.005 wt.-% to 0.1 wt.-% Fe,
0 wt.-% to 0.01 wt.-% Mn,
1.55 wt.-% to 1.9 wt.-% Mo,
2.4 wt.-% to 2.8 wt.-% W,
3.3 wt.-% to 3.67 wt.-% Al,
3.2 wt.-% to 3.3 wt.-% Ti,
0.7 wt.-% to 0.9 wt.-% Nb,
1.1 wt.-% to 1.4 wt.-% Ta,
0.05 wt.-% to 0.2 wt.-% Hf,
0 wt.-% to 0.03 wt.-% Si,
0 wt.-% to 0.001 wt.-% P,
0 wt.-% to 0.001 wt.-% S,
0 wt.-% to 0.24 wt.-% O,
0 wt.-% to 0.005 wt.-% N,
0.07 wt.-% to 0.9 wt.-% C,
0.001 wt.-% to 0.02 wt.-% Zr,
0.007 wt.-% to 0.012 wt.-% B,
0.001 wt.-% to 0.81 wt.-% Y,
incidental impurities
rest nickel,
based on the total weight of the metal composition.

7. The metal composition according to claim 1, wherein the metal composition consists of:
7.7 wt.-% to 9.3 wt.-% Co,
15.5 wt.-% to 16.6 wt.-% Cr,
0.001 wt.-% to 0.13 wt.-% Fe,
0 wt.-% to 0.02 wt.-% Mn,
1.3 wt.-% to 2.2 wt.-% Mo,
2.1 wt.-% to 3.1 wt.-% W,
3 wt.-% to 4.22 wt.-% Al,
3 wt.-% to 4 wt.-% Ti,
0.45 wt.-% to 1.35 wt.-% Nb,
0.9 wt.-% to 1.6 wt.-% Ta,
0.001 wt.-% to 0.8 wt.-% Hf,
0 wt.-% to 0.05 wt.-% Si,
0 wt.-% to 0.01 wt.-% P,
0 wt.-% to 0.01 wt.-% S,
0 wt.-% to 0.31 wt.-% O,
0 wt.-% to 0.01 wt.-% N,
0.03 wt.-% to 0.15 wt.-% C,
0 wt.-% to 0.03 wt.-% Zr,
0.004 wt.-% to 0.015 wt.-% B,
0 wt.-% to 1.06 wt.-% Y,
incidental impurities
wherein up to 1.3 wt.-% of the metal composition is present as metal oxide particles selected from the group consisting of $Y_2O_3$ and $YAlO_3$,
rest nickel,
based on the total weight of the metal composition.

8. The metal composition according to claim 7, wherein at least 90 wt.-% of the metal oxide particles are Y$_2$O$_3$ particles.

9. The metal composition according to claim 1, wherein the metal composition consists of:
 8 wt.-% to 9 wt.-% Co,
 15.7 wt.-% to 16.3 wt.-% Cr,
 0.005 wt.-% to 0.1 wt.-% Fe,
 0 wt.-% to 0.01 wt.-% Mn,
 1.5 wt.-% to 2 wt.-% Mo,
 2.4 wt.-% to 2.8 wt.-% W,
 3 wt.-% to 4.22 wt.-% Al,
 3.2 wt.-% to 3.7 wt.-% Ti,
 0.6 wt.-% to 1.1 wt.-% Nb,
 1.1 wt.-% to 1.4 wt.-% Ta,
 0.005 wt.-% to 0.6 wt.-% Hf,
 0 wt.-% to 0.03 wt.-% Si,
 0 wt.-% to 0.001 wt.-% P,
 0 wt.-% to 0.001 wt.-% S,
 0 wt.-% to 0.31 wt.-% O,
 0 wt.-% to 0.005 wt.-% N,
 0.06 wt.-% to 0.1 wt.-% C,
 0.001 wt.-% to 0.02 wt.-% Zr,
 0.007 wt.-% to 0.012 wt.-% B,
 0 wt.-% to 1.06 wt.-% Y,
 incidental impurities
 wherein up to 1 wt.-% of the metal composition is present as metal oxide particles selected from the group consisting of Y$_2$O$_3$ and YAlO$_3$,
 rest nickel,
 based on the total weight of the metal composition.

10. The metal composition according to claim 1, wherein the metal composition consists of:
 8 wt.-% to 9 wt.-% Co,
 15.7 wt.-% to 16.3 wt.-% Cr,
 0.005 wt.-% to 0.1 wt.-% Fe,
 0 wt.-% to 0.01 wt.-% Mn,
 1.55 wt.-% to 1.9 wt.-% Mo,
 2.4 wt.-% to 2.8 wt.-% W,
 3 wt.-% to 4.2 wt.-% Al,
 3.2 wt.-% to 3.3 wt.-% Ti,
 0.7 wt.-% to 0.9 wt.-% Nb,
 1.1 wt.-% to 1.4 wt.-% Ta,
 0.05 wt.-% to 0.2 wt.-% Hf,
 0 wt.-% to 0.03 wt.-% Si,
 0 wt.-% to 0.001 wt.-% P,
 0 wt.-% to 0.001 wt.-% S,
 0 wt.-% to [[0.02]]0.31 wt.-% O,
 0 wt.-% to 0.005 wt.-% N,
 0.07 wt.-% to 0.09 wt.-% C,
 0.001 wt.-% to 0.02 wt.-% Zr,
 0.007 wt.-% to 0.012 wt.-% B,
 0 wt.-% to 1.06 wt.-% Y,
 incidental impurities
 wherein up to 1 wt.-% of the metal composition is present as metal oxide particles selected from the group consisting of Y$_2$O$_3$ and ceramic particles,
 rest nickel,
 based on the total weight of the metal composition.

11. The metal composition according to claim 1, wherein the metal composition contains no metal oxide particles.

12. A method for additive manufacturing or 3D-printing, comprising: using a metal composition according to claim 1.

13. A product comprising: a metal composition according to claim 1.

14. The product according to claim 13, wherein the product is selected from the group consisting of vanes, blades, heat shields and burners of a streaming engine.

15. A product, comprising: a metal composition manufactured according to the method of claim 12.

16. The metal composition according to claim 3, wherein at least 50 wt.-% of the Y is part of metal oxide particles.

17. The metal composition according to claim 3, wherein at least 80 wt.-% of the Y is part of metal oxide particles.

18. The metal composition according to claim 10, wherein up to 1 wt.-% of the metal composition is present as metal oxide particles selected from the group consisting of Y$_2$O$_3$ and ceramic particles comprising Al$_2$O$_3$, and SiO$_2$.

19. The metal composition according to claim 1, wherein up to 1 wt.-% of the metal composition is present as metal oxide particles selected from the group consisting of Y$_2$O$_3$, Al$_2$O$_3$ and SiO$_2$.

* * * * *